(12) United States Patent
Sasaki et al.

(10) Patent No.: US 8,935,984 B2
(45) Date of Patent: Jan. 20, 2015

(54) VEHICLE-BODY INCLINATION DEVICE AND DOUBLE-LAYER THREE-WAY VALVE USED IN VEHICLE-BODY INCLINATION DEVICE

(75) Inventors: Katsumi Sasaki, Nagoya (JP); Hiroshi Shinmura, Toyokawa (JP); Tetsuya Hayashi, Kasugai (JP); Takeyoshi Mihara, Toyohashi (JP); Naohide Kamikawa, Toyokawa (JP)

(73) Assignees: Pneumatic Servo Controls Ltd., Aichi-ken (JP); Nippon Sharyo, Ltd., Aichi-ken (JP)

( * ) Notice: Subject to any disclaimer, the term of this patent is extended or adjusted under 35 U.S.C. 154(b) by 0 days.

(21) Appl. No.: 14/116,469

(22) PCT Filed: May 9, 2012

(86) PCT No.: PCT/JP2012/061863
§ 371 (c)(1),
(2), (4) Date: Nov. 8, 2013

(87) PCT Pub. No.: WO2012/153759
PCT Pub. Date: Nov. 15, 2012

(65) Prior Publication Data
US 2014/0060379 A1    Mar. 6, 2014

(30) Foreign Application Priority Data
May 9, 2011    (JP) ................. 2011-104412

(51) Int. Cl.
*B61F 5/22*    (2006.01)
*B61F 5/10*    (2006.01)
(Continued)

(52) U.S. Cl.
CPC ... *B61F 5/22* (2013.01); *B61F 5/10* (2013.01); *B61F 5/245* (2013.01); *F16K 11/0716* (2013.01)
USPC ..................... 105/199.1; 105/199.2

(58) Field of Classification Search
CPC ............. B61F 5/22; B61F 5/45; B61F 5/245; B61F 5/10; F16K 11/0716
USPC .............. 105/199.1, 199.2; 137/625.48
See application file for complete search history.

(56) References Cited

U.S. PATENT DOCUMENTS 5,921,185 A * 7/1999 Hoyon et al. ............ 105/4.1
5,943,962 A * 8/1999 Birkhahn et al. ........ 105/199.2
(Continued)

FOREIGN PATENT DOCUMENTS

JP    40018812 A    7/1965
JP    3153160 B2    1/2001
(Continued)

OTHER PUBLICATIONS

English translation of the International Preliminary Report on Patentability issued on Nov. 21, 2013 in connection with International Application PCT/JP2012/061863, 6 pages.
(Continued)

*Primary Examiner* — Jason C Smith
(74) *Attorney, Agent, or Firm* — Gesmer Updegrove LLP

(57) ABSTRACT

A carriage-body inclination device (30) has individual inclination units (112, 113) that are provided corresponding to air springs (22, 23), and a control unit (110). The individual inclination unit (112) can sufficiently execute supply or release of air to or from the air spring (22) by driving a control valve (40) and a large-capacity valve (170) using a height difference value which is a difference between a height instruction value provided by the control unit (110) and a height value obtained from a link-lever mechanism (24). The control valve (40) has a two-layer structure of a fixed sleeve (91), a control sleeve (90), and a spool (80). The control sleeve (90) is moved and driven by the link-lever mechanism (24) and a rotation-translation conversion mechanism (44). The spool (80) is moved and driven by a spool actuator (120) according to a set height value.

6 Claims, 7 Drawing Sheets

(51) Int. Cl.
*B61F 5/24* (2006.01)
*F16K 11/07* (2006.01)

(56) References Cited

U.S. PATENT DOCUMENTS

| | | | | |
|---|---|---|---|---|
| 6,131,520 | A * | 10/2000 | Dull | 105/199.2 |
| 6,273,002 | B1 * | 8/2001 | Hachmann et al. | 105/199.1 |
| 6,279,488 | B1 * | 8/2001 | Hachmann et al. | 105/453 |
| 6,474,455 | B1 * | 11/2002 | Blaschko et al. | 191/45 R |
| 6,978,719 | B2 * | 12/2005 | Sebata et al. | 105/199.1 |
| 8,356,557 | B2 * | 1/2013 | Schneider | 105/199.2 |
| 8,667,900 | B2 * | 3/2014 | Shinmura et al. | 105/199.1 |
| 8,807,049 | B2 * | 8/2014 | Gotou | 105/199.1 |
| 2002/0035947 | A1 * | 3/2002 | Sebata et al. | 105/199.2 |
| 2012/0067444 | A1 * | 3/2012 | Amikura | 137/627.5 |
| 2012/0227617 | A1 * | 9/2012 | Schneider | 105/199.2 |
| 2013/0032054 | A1 * | 2/2013 | Schneider et al. | 105/199.1 |
| 2013/0145955 | A1 * | 6/2013 | Gotou | 105/199.1 |
| 2013/0180427 | A1 * | 7/2013 | Shinmura et al. | 105/199.1 |
| 2014/0020595 | A1 * | 1/2014 | Shinagawa | 105/199.1 |
| 2014/0060379 | A1 * | 3/2014 | Sasaki et al. | 105/199.1 |
| 2014/0196627 | A1 * | 7/2014 | Ogawa et al. | 105/199.1 |
| 2014/0196628 | A1 * | 7/2014 | Ogawa et al. | 105/199.1 |

FOREIGN PATENT DOCUMENTS

| | | |
|---|---|---|
| JP | 2001315516 A | 11/2001 |
| JP | 2002297243 A | 10/2002 |
| JP | 2004052889 A | 2/2004 |
| JP | 2004270870 A | 9/2004 |
| JP | 2005003163 A | 1/2005 |
| JP | 2007187296 A | 7/2007 |
| JP | 2008100614 A | 5/2008 |
| JP | 2010103199 A | 5/2010 |
| JP | 2011-000949 A | 1/2011 |
| JP | 2011-16441 A | 1/2011 |

OTHER PUBLICATIONS

International Search Report and English translation thereof Issued in connection with PCT Application No. PCT/JP2012/061863, mailed on Jul. 24, 2012.

Japanese translation of the International Preliminary Report on Patentability mailed on Nov. 21, 2013 in connection with International Application PCT/JP2012/061863, 6 pages.

English translation of the International Preliminary Report on Patentability mailed on Nov. 21, 2013 in connection with International Application PCT/JP2012/061863, 6 pages.

* cited by examiner

VEHICLE-BODY INCLINATION DEVICE AND DOUBLE-LAYER THREE-WAY VALVE USED IN VEHICLE-BODY INCLINATION DEVICE

PRIORITY INFORMATION

The present application is a 371 National Phase Application of PCT Application No. PCT/JP2012/061863, filed on May 9, 2012, which claims priority to JP Application No. 2011-104412, filed on May 9, 2011, all of which are incorporated herein by reference in their entireties.

TECHNICAL FIELD

The present invention relates to a carriage-body inclination device and to a two-layer three-way valve used in the carriage-body inclination device, and in particular to a carriage-body inclination device which inclines a carriage body with respect to a dolly by expanding or contracting an air spring provided between the dolly of a railroad carriage and the carriage body, and to a two-layer three-way valve used in the carriage-body inclination device.

BACKGROUND ART

In transportation facilities using railroads, in order to improve the feeling of comfort of passengers or the like, an air spring is provided between a dolly and a carriage body. The air spring is provided at each of front and rear sides and left and right sides of one carriage so that the carriage body can be moved in the up-and-down direction with respect to the dolly by supplying pressurized air from a pressurized air source to the air spring or by releasing the air in the air spring to the atmosphere. When the air is supplied to or released from all of the air springs at the front, rear, left, and right sides, the carriage body can be translated up and down. When the air is supplied to only one of the left and right air springs or when, in addition to this configuration, the air is released from the other air spring, the carriage body can be inclined in the left-and-right direction (width direction).

For example, a level adjustment control for adjusting the height may be applied when the overall height of the carriage body with respect to the dolly becomes higher or lower than a predefined height. In addition, a carriage-body inclination control may be applied to incline the carriage body toward an inside of a curve in order to lessen an excessive centrifugal force which occurs due to insufficient cant of the rail when the carriage travels on a curved rail.

Patent Document 1 discloses a body height-measuring device for controlling carriage-body inclination which can execute a high-precision height measurement during carriage-body inclination control. In this technique, for the level adjustment control, one end of an on-off operation lever is integrally and rotatably coupled to a tip of a shaft which integrally rotates with an on-off operation unit of an automatic height adjustment valve, one end of an adjustment bar is connected to the tip of the on-off operation lever, the other end of the adjustment bar is connected via a bracket to the dolly, and a height-measuring encoder is provided on the shaft. When the height, which is in the up-and-down direction of the carriage body with respect to the dolly, changes; for example, when the height is reduced, the tip side of the on-off operation lever is pushed and raised via the adjustment bar, the automatic height adjustment valve is switched, the pressurized air is supplied to the air spring, and the height of the carriage body is increased. When the air spring is extended, the tip side of the on-off operation lever is pulled downward via the adjustment bar, and the supply of the pressurized air to the air spring is stopped. In this manner, a floor surface of the carriage body with respect to the dolly is controlled at a certain height.

When the carriage-body inclination control is applied, using the height-measuring encoder, the air communication system for level adjustment is blocked, an air pressure circuit system for carriage-body inclination control is activated, a small-size air supply valve is opened to start supply of air to the air spring, and then, a large-size air supply valve is opened to increase the carriage height. When the height reaches a predetermined height, the large-size air supply valve is closed and, then the small-size air supply valve is closed. When the carriage height is to be reduced, a release valve is opened to effect releasing of air from the air spring.

RELATED ART REFERENCES

Patent Document

[Patent Document 1] Japanese Patent No. 3153160

DISCLOSURE OF INVENTION

Technical Problem

If the automatic height adjustment valve, designed for level adjustment control for controlling the floor surface of the carriage body with respect to the dolly at a certain height according to an increase or a decrease of a number of passengers, is to be used for the carriage-body inclination control, the air supply or release capability would be insufficient, and the carriage may fail to be inclined at a sufficient rate corresponding to the velocity of the curve traveling. Thus, as described in Patent Document 1, there is employed a configuration in which an air supply valve and an air release valve separate from the automatic height adjustment valve are used, and, during the carriage-body inclination control, the automatic height adjustment valve is not used and the air supply valve and the air release valve are used to quickly extend or contract the air springs.

However, such a configuration of using the automatic height adjustment valve for level adjustment control and using the air supply valve and the air release valve separate from the automatic height adjustment valve for the carriage-body inclination control does not fully take advantage of the automatic height adjustment valve.

An advantage of the present invention is in the provision of a carriage-body inclination device and a two-layer three-way valve used in the carriage-body inclination device, which allows quick carriage-body inclination control while sufficiently taking advantage of the automatic height adjustment valve for level adjustment control.

Solution to Problem

According to one aspect of the present invention, there is provided a carriage-body inclination device that supplies gas to or releases the gas from an air spring placed between a carriage body of a carriage and a dolly, to extend or contract the air spring and to change a height value which is a height between the carriage body and the dolly, the carriage-body inclination device comprising: a two-layer three-way valve including a spool that has a small-size stem and a large-size land, a fixed sleeve that has a supply port connected to a gas supply source, a release port, and a load port connected to the air spring, and a control sleeve that is slidably supported on the fixed sleeve on an outer circumferential side, that slidably supports the spool on an inner circumferential side, that has a load hole corresponding at least to the land of the spool, that can be moved relative to the fixed sleeve within a predetermined movement range which is defined in advance, and in which the load hole is in a range of the load port of the fixed sleeve in the predetermined movement range, wherein an amount of flow of gas supplied from the supply port via the load port to the air spring is determined or an amount of flow of gas released from the air spring via the load port and through the release port is determined based on a relative positional relationship between the land of the spool and the load hole of the control sleeve; a spool actuator that moves and drives the spool in an axial direction with respect to the fixed sleeve of the two-layer three-way valve according to a set height value which is a setting value for the height value; and a sleeve actuator that moves and drives the control sleeve in an axial direction with respect to the spool of the two-layer three-way valve according to a height difference value which is a difference between the set height value and an actual height value.

According to another aspect of the present invention, preferably, in the carriage-body inclination device, the sleeve actuator comprises a link lever mechanism that has a dolly-side arm having one end rotatably supported on a dolly side and the other end rotatably supported by a rotation connection section, and a carriage-body-side arm having one end rotatably supported by the rotation connection section and the other end rotatably supported on a carriage-body side, and in which a shape formed by the dolly-side arm and the carriage-body-side arm changes according to the height value, a rotational unit that is provided on a carriage-body-side support unit of the link lever mechanism and that rotates according to the shape change of the link lever mechanism, and a rotation-translation conversion mechanism that converts a rotation of the rotational unit into a translational movement of the sleeve in the axial direction.

According to another aspect of the present invention, preferably, the carriage-body inclination device further comprises a control sleeve sensor that detects a state of the control sleeve of the two-layer three-way valve and that outputs the detected state as an electrical signal, and a large-capacity valve that is driven by an electrical signal and according to an output of the control sleeve sensor, that has a larger flow capacity than the two-layer three-way valve, and in which an output hole is connected to the air spring together with the load hole of the two-layer three-way valve.

According to another aspect of the present invention, preferably, the carriage-body inclination device further comprises a spool sensor that detects a state of the spool of the two-layer three-way valve and that outputs the detected state as an electrical signal, and a feedback loop that feeds back an output of the spool sensor to a drive signal of the spool actuator.

According to another aspect of the present invention, preferably, in the carriage-body inclination device, the spool of the two-layer three-way valve has a stem section that has a release opening on an on-off-valve end side which is one end side in the axial direction, that extends in the axial direction, and in which a central hole through which the other end is in communication with the release port is provided, and a central land section having a larger outer size than the stem section, the control sleeve has a load hole that has, on an on-off-valve end side which is one end side in the axial direction, an on-off-valve-side opening having a larger inner size than an outer size of the spool at the on-off-valve end side, that slidably supports the spool in the axial direction, and that is placed at a position blocked by the central land section of the spool when the relative position with the spool is at a neutral state, and two openings that are provided in front and rear of the load hole along the axial direction and that are in communication with each other beyond the load hole, and with respect to the two-layer three-way valve, there is provided a supply on-off valve having a tubular on-off-valve body having one end side connected to the gas supply source and the other end side connected to the on-off-valve end of the control sleeve, an on-off-valve disc that is stored in the on-off-valve body and that has a size to block the on-off-valve-side opening of the control sleeve, and an urging unit that urges the on-off-valve disc toward the on-off-valve end side of the control sleeve.

According to another aspect of the present invention, there is provided a two-layer three-way valve for a carriage-body inclination device, comprising: a spool that has a small-size stem and a large-size land; a fixed sleeve that has a supply port connected to a gas supply source, a release port, and a load port connected to an air spring; and a control sleeve that is slidably supported on the fixed sleeve on an outer circumferential side, that slidably supports the spool on an inner circumferential side, that has a load hole corresponding at least to the land of the spool, that can be moved relative to the fixed sleeve within a predetermined movement range which is defined in advance, and in which the load hole is in a range of the load port of the fixed sleeve in the predetermined movement range, wherein an amount of flow of gas supplied from the supply port via the load port to the air spring is determined or an amount of flow of gas released from the air spring via the load port, and through the release port is determined based on a relative positional relationship between the land of the spool and the load hole of the control sleeve.

Advantageous Effects of Invention

With the above-described configurations, in the carriage-body inclination device, in the spool-sleeve mechanism, a control sleeve which is movable relative to both the fixed sleeve and the spool is provided separately from the fixed sleeve. When the height difference value which is a difference between a set height value and an actual height value is to be set to zero, the sleeve actuator is used to move and drive the control sleeve in the axial direction with respect to the spool. This function is identical to the level adjustment control of the related art if the set height value coincides with a standard height value which is set in advance. In the level adjustment control, the position of the spool with respect to the fixed sleeve is set at a fixed position corresponding to the standard height value, and the control sleeve is moved and driven with respect to the spool according to the height difference value. This structure corresponds to a structure obtained by reversing the spool and the sleeve in the automatic height adjustment valve of the related art.

When the carriage body is to be inclined with a set height value different from the standard height value, the spool actuator is used to move and drive the spool in the axial direction with respect to the fixed sleeve and the control sleeve. With such a configuration, the standard height value of the automatic height adjustment valve of the related art can be offset and set at the set height value. In this state, the flow path of the two-layer three-way valve is opened, and the pressurized gas is supplied to or released from the air spring. Thus, the carriage body moves in the up-and-down direction, the link lever mechanism formed by the dolly-side arm and the carriage-body-side arm is operated, the sleeve actuator is moved in a direction to set the height difference value to zero, and a control to set the height value to the set height value can be applied. In this manner, because a two-system independent control is employed for the control of the control valve, both the level adjustment control and the carriage-body inclination control can be quickly executed while sufficiently taking advantage of the automatic height adjustment valve.

In addition, in the carriage-body inclination device, the sleeve actuator comprises the link lever mechanism having the dolly-side arm and the carriage-body-side arm, and a rotation-translation conversion mechanism which converts the shape change of the link lever mechanism into a translational movement in the axial direction of the control sleeve. This structure is identical to the link lever mechanism in the automatic height adjustment valve used in the related art. Therefore, both the level adjustment control and the carriage-body inclination control can be quickly executed while sufficiently using the related art, which is known to have sufficient fastness properties and operability.

Moreover, in the carriage-body inclination device, the states of the control sleeve and the spool of the two-layer three-way valve are detected, and a difference therebetween is output as an electrical signal. The large-capacity valve having a larger flow capacity than the two-layer three-way valve is driven with the electrical signal according to the difference, and an output hole thereof is connected to the air spring together with the load hole of the two-layer three-way valve. Therefore, in the inclination control of the carriage body, a larger amount of flow can be supplied to the air spring or a larger amount of flow can be released from the air spring than in the case employing a structure with only the two-layer three-wavy valve. With this structure, the carriage-body inclination control can be more quickly executed as compared with a case where only the two-layer three-way valve is used.

Furthermore, in the carriage-body inclination device, the state of the spool of the two-layer three-way valve is detected and is output as an electrical signal, and the electrical signal is fed back to the drive signal of the spool actuator. Because of this, the position of the spool can be determined with a high rigidity which is not easily affected by a change.

In the carriage-body inclination device, the basic structure employed is the spool-sleeve mechanism in which a load hole corresponding to the central land section is placed, as are two openings provided in front and rear of the load hole and that are in communication with each other. In the spool, a hole for releasing is provided along the axial direction. When one end side in the axial direction of the spool-sleeve mechanism is set as the on-off-valve end side, a supply on-off valve having the on-off-valve disc which is urged by the urging unit toward the on-off-valve end side of the control sleeve is placed on the on-off-valve end side. When such a configuration is employed, if the spool is moved with respect to the control sleeve toward the on-off-valve end side, the on-off-valve disc moves toward the supply port side to the gas supply source while resisting the urging force of the urging unit, and the supply port and the on-off-valve side opening of the control sleeve become in communication with each other, and, thus, the supply port and the air spring become in communication with each other. When the spool moves in the opposite side with respect to the control sleeve, the on-off-valve disc blocks the on-off-valve side opening of the control sleeve due to the urging force of the urging unit of the supply on-off valve, and a gap is created between the on-off-valve end side of the spool and the on-off-valve disc. Thus, the release opening of the spool and the internal space of the control sleeve become in communication with each other and the release port and the air spring become in communication with each other. In this manner, there can be realized a carriage-body inclination device of a novel concept having the basic structure of the spool-sleeve mechanism.

BEST MODE FOR CARRYING OUT THE INVENTION

Figure 1:
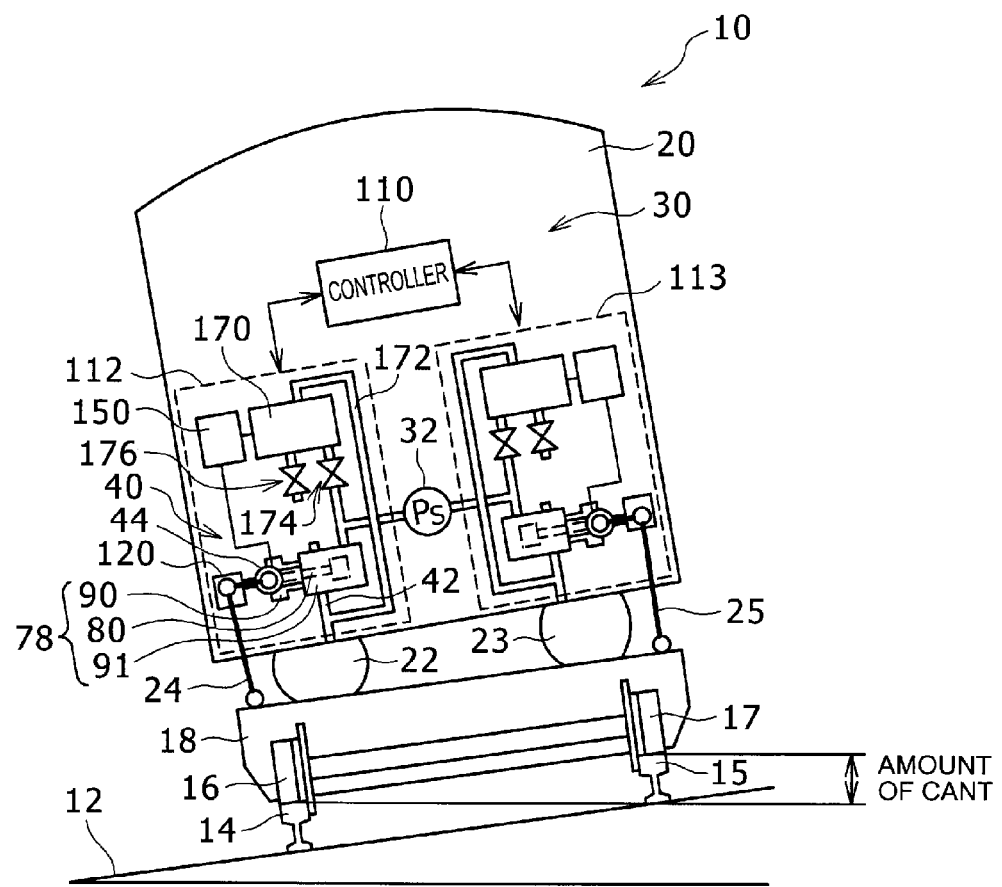
FIG. 1 is a diagram for explaining a carriage in which a carriage-body inclination device according to a preferred embodiment of the present invention is used.

A preferred embodiment of the present invention will now be described in detail with reference to the attached drawings. In the following description, a spool-sleeve type control valve is explained as a structure corresponding to the automatic height adjustment valve of the related art, but such a structure is merely exemplary, and other structures may be employed so long as the valve is a gas control valve having three ports including a load port in communication with the air spring, a supply port in communication with the gas supply source, and a release port opened to the atmosphere side. Similarly, a control valve serving as the three-way valve of the spool-sleeve type and driven by an electrical actuator is explained as the large-capacity valve, but this is merely exemplary, and other structures may be employed so long as the valve is a gas valve controlled by an electrical signal and having a sufficiently large flow capacity. For example, the large-capacity valve may be a simple ON-OFF valve. As the spool actuator, a force motor of a moving coil type will be explained, but other types, such as a plunger type actuator, may alternatively be employed. In some cases, a combination of a small-size motor such as a stepping motor or a servo motor and a linear movement mechanism such as a ball screw may be employed.

The following description explains that pressurized air is supplied to the air spring. In this case, the air may be the atmospheric air, or, may alternatively be dry air, gas in which the compositional ratio of nitrogen and oxygen is suitably changed, or gas in which suitable inert gas or the like is added.

In the following description, a carriage-body inclination device which uses an extension/contraction control of the air spring will be primarily described, but such a description is merely for the purpose of explaining application examples. The present invention can be applied to structures other than the carriage-body inclination device such as, for example, a vibration-removing device in a horizontal orientation maintaining mechanism of a vibration preventing table.

In addition, in the following description, similar elements are assigned the same reference numerals in all drawings, and their descriptions will not be repeated. In the description in this text, reference numerals which have been used in preceding description may be used in subsequent description as necessary.

FIG. 1 is a diagram for explaining a structure of a carriage 10 in which a carriage-body inclination device 30 is used. The carriage 10 comprises a dolly 18 having wheels 16 and 17 which rotate on rails 14 and 15 provided on a road surface 12, a carriage body 20 used by passengers or the like, air springs 22 and 23 provided between the dolly 18 and the carriage body 20, and link lever mechanisms 24 and 25 provided between the dolly 18 and the carriage body 20. For one carriage, air springs and corresponding link lever mechanisms are provided on the front, rear, left, and right sides, but in FIG. 1, only two air springs 22 and 23 and two link lever mechanisms 24 and 25 on the left and right are shown. Here, elements of the carriage-body inclination device 30 will be briefly described, and the detailed and specific structures will be explained later with reference to FIG. 3 and subsequent drawings.

In FIG. 1, the road surface 12 is inclined and there is a difference in height between the left and right rails 14 and 15. This difference is given to incline the carriage body 20 so that, when the rails are provided in a curved shape and the carriage travels on the curve, the passengers in the carriage body 20 do not feel the centrifugal force. A height difference between the rail 14 on the inner side of the curve and the rail 15 on the outer side of the curve is referred to as an amount of cant. The amount of cant is set according to the set velocity of the carriage traveling on the curved portion. Therefore, for a carriage traveling at a high velocity greater than or equal to the set velocity, an excessive centrifugal force would be created.

In order to prevent the passengers in the carriage body 20 from feeling the excessive centrifugal force, the carriage body 20 may be inclined with respect to the dolly 18 toward the inner side of the curve to correspond to the amount of cant corresponding to the high-velocity traveling. Such a control to incline the carriage body 20 with respect to the dolly 18 in this manner is called carriage-body inclination control. The example configuration of FIG. 1 shows that the air spring 22 is contracted and the air spring 23 is extended, so that the carriage body 20 is inclined with respect to the dolly 18 with the side of the air spring 22 of the carriage body 20 being lower.

The link lever mechanisms 24 and 25 are mechanisms each having a dolly-side arm having one end rotatably supported with respect to the dolly 18, and a lever which is a carriage-body-side arm having the other end rotatably supported with respect to the carriage body 20, and in which the other end of the dolly-side arm and the one end of the carriage-body-side arm are rotatably connected to each other. When the height position of the carriage body 20 with respect to the dolly 18 changes, the link shapes of the link lever mechanisms 24 and 25 change, and the shape change is uniquely determined by the height of the carriage body 20 with respect to the dolly 18. Thus, for example, an inclination angle of the carriage-body-side arm with respect to a reference surface of the carriage body 20 which is defined in advance may be used as a height correspondent value corresponding to the height of the carriage body with respect to the dolly. In this respect, the link lever mechanisms 24 and 25 are height detectors which can provide the height correspondent values as the height values.

The carriage-body inclination device 30 comprises individual inclination units 112 and 113 provided corresponding to the air springs 22 and 23, and a controller 110 that integrally controls the plurality of individual inclination units 112 and 113. As the individual inclination units 112 and 113 are structures symmetrical in the left-and-right direction in the example configuration of FIG. 1, in the following, the explanation will be given with respect to the individual inclination unit 112 as the representative structure.

Using a height instruction value given by the controller 110 and a height difference which is a difference with respect to the height value obtained by the link lever mechanism 24, the individual inclination unit 112 drives a control valve 40 and a large-capacity valve 170 having a larger flow capacity than the control valve, so that sufficient supply or release of air with respect to the air spring 22 can be achieved.

On each of the control valve 40 and the large-capacity valve 170, a supply hole connecting section, a release hole opening section, and a load hole connecting section are provided. A gas supply source 32 of FIG. 1 is a gas source that is connected to the supply hole connecting sections of the control valve 40 and the large-capacity valve 170, and that supplies pressurized air. The releasing is effected by opening the release hole opening sections of the control valve 40 and the large-capacity valve 170 to the side of the atmosphere.

The control valve 40 has a spool-sleeve mechanism, and includes a two-layer three-way valve 78 having a supply port, a release port, and a load port. Here, the sleeve is divided into two layers or parts, and is divided into a control sleeve 90 and a fixed sleeve 91. The fixed sleeve 91 is a housing of the spool-sleeve mechanism, and corresponds to a sleeve of a typical spool-sleeve mechanism. The control sleeve 90 is a member that is slidably supported on the fixed sleeve 91 on an outer circumferential side, and that slidably supports a spool 80 on an inner circumferential side.

The spool 80 is moved and driven by a spool actuator, and the control sleeve 90 is moved and driven by the link lever mechanism 24 via a rotation-translation conversion mechanism 44. A state of the spool 80 and a state of the control sleeve 90 are detected by respective sensors. FIG. 1 shows a situation where an electrical signal indicating the state of the control sleeve 90 is supplied to a large-capacity-valve driving unit 150. A detailed structure of the control valve 40 will be described later with reference to FIGS. 2 and 3. An electrical signal indicating the state of the spool 80 is supplied to the controller 110, as will be described with reference to FIG. 2.

The large-capacity-valve driving unit 150 is a circuit that outputs an electrical signal corresponding to a difference between a position of the spool 80 and a position of the control sleeve 90 as a drive signal to the large-capacity valve 170. The large-capacity valve 170 is a valve having a sufficiently larger flow capacity than a flow capacity of the two-layer three-way valve 78. For example, the large-capacity valve 170 is a gas valve having at least twice, more preferably a flow capacity of 5 to 10 times the flow capacity of the two-layer three-way valve 78. Similar to the two-layer three-way valve 78, as the large-capacity valve 170, a spool-sleeve type three-way valve may be employed.

A control valve path 42 is a load path connecting the load hole connecting section of the control valve 40 and the air spring 22. A large-capacity valve path 172 is a large-capacity load path connecting the load hole connecting section of the large-capacity valve 170 and the air spring 22. As shown in FIG. 1, the control valve path 42 and the large-capacity valve path 172 are merged with each other and connected to the air spring 22. Therefore, the air spring 22 can be supplied with the pressurized air from both the control valve 40 and the large-capacity valve 170, and the air spring 22 can be opened to the atmosphere and the air can be released from the air spring 22 via the control valve 40 and the large-capacity valve 170.

An on-off valve 174 provided on the supply hole connecting section of the large-capacity valve 170 and an on-off valve 176 provided on a release hole opening section of the large-capacity valve 170 are opened when the inclination control of the carriage body is executed, so that the large-capacity valve 170 is operated.

Figure 2:
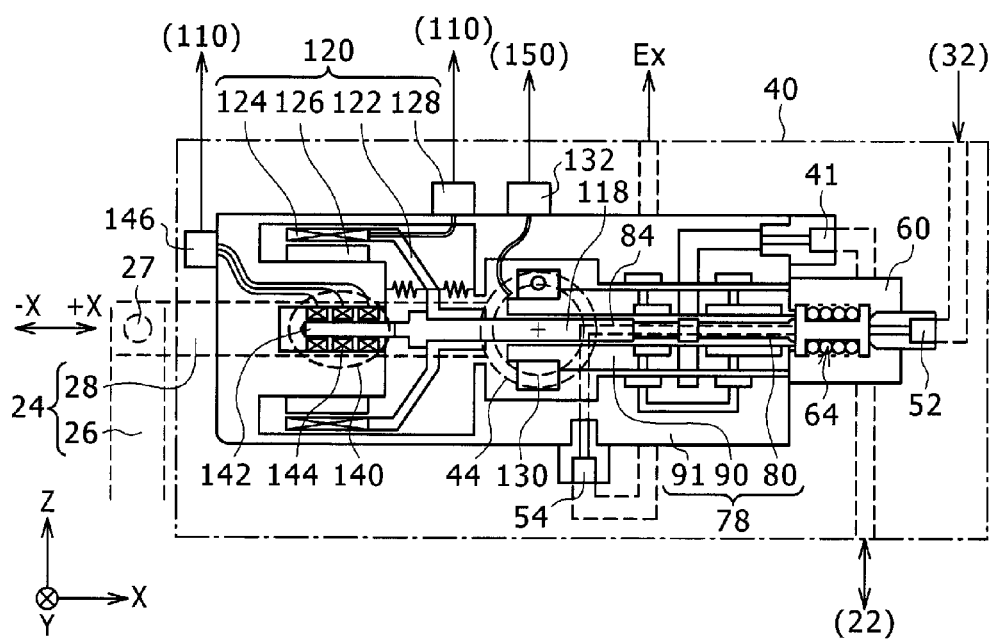
FIG. 2 is a detailed structural diagram of a control valve used in a carriage-body inclination device according to a preferred embodiment of the present invention.
Figure 3:
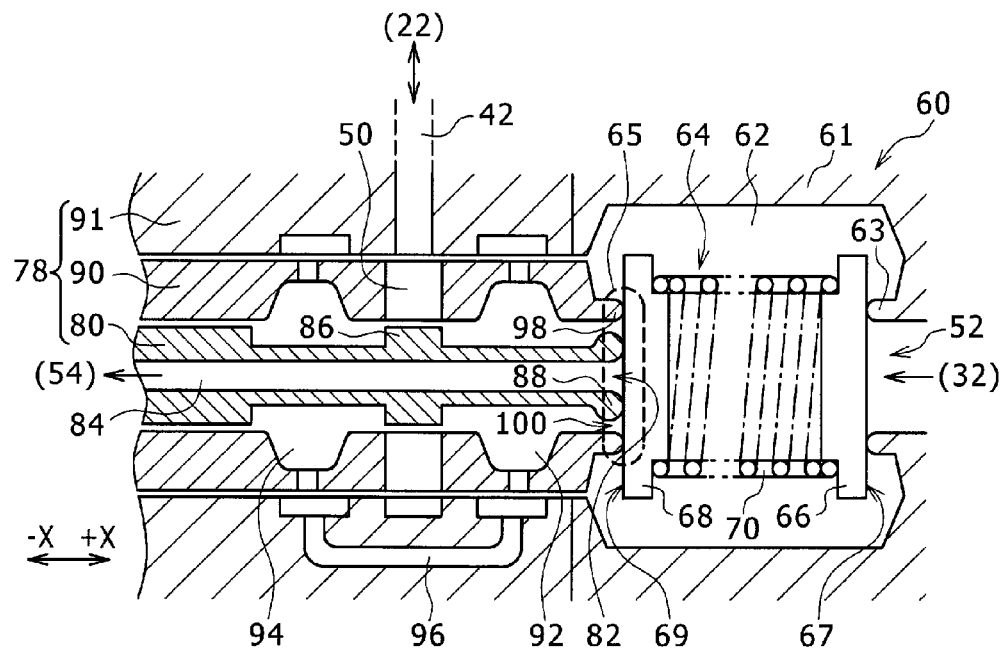
FIG. 3 is a detailed diagram related to a supply on-off valve and a two-layer three-way valve in a preferred embodiment of the present invention.
Figure 4:
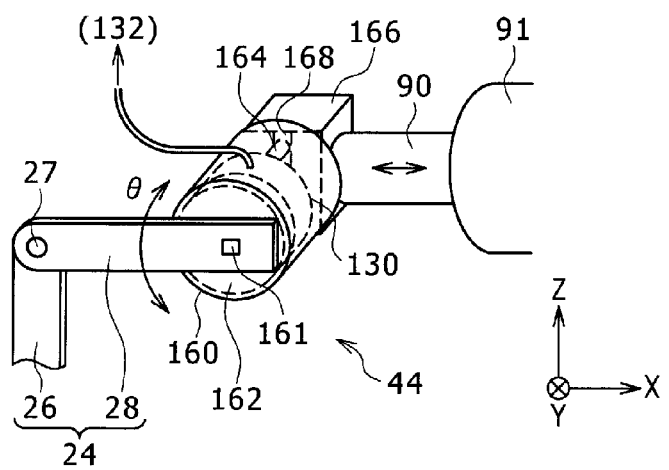
FIG. 4 is a detailed structural diagram of a rotation-translation conversion mechanism in a preferred embodiment of the present invention.

Next, a detailed structure of the control valve 40 will be described with reference to FIGS. 2-4. In general, the control valve 40 comprises a supply on-off valve 60, the two-layer three-way valve 78, the rotation-translation conversion mechanism 44 corresponding to a control sleeve actuator, a spool actuator 120, a control sleeve sensor 130, and a spool sensor 140. FIG. 2 is a structural diagram of the overall control valve 40, FIG. 3 is a partial detailed diagram of the supply on-off valve 60 and the two-layer three-way valve 78, and FIG. 4 is a detailed diagram of the rotation-translation conversion mechanism 44. In these diagrams, orthogonal X, Y, and Z axes are shown. An X direction is the movement direction of the spool 80 and the control sleeve 90.

The control valve 40 comprises three gas circulation holes including a supply hole connecting section 52, a release hole opening section 54, and a load hole connecting section 41, and three signal connecting sections including a spool drive control port 128, a control sleeve sensor port 132, and a spool sensor port 146. These structures are mounted on the housing of the control valve 40. The housing of the control valve 40 is obtained by connecting housings of the constituting elements, because the control valve 40 is a combination of the plurality of constituting elements. Here, the fixed sleeve 91 which is a housing of the two-layer three-way valve 78 is taken as a representative housing, and will be called the housing of the control valve 40.

The supply hole connecting section 52 is a connecting hole for supplying pressurized air from the gas supply source 32 to the supply on-off valve 60. The release hole opening section 54 is an open end connected to the release port of the two-layer three-way valve 78 and opening to the atmosphere. The load hole connecting section 41 is a connecting hole for connecting the load port of the two-layer three-way valve 78 and the air spring 22. A suitable filter may be provided on the supply hole connecting section 52 and the load hole connecting section 41. In addition, a suitable muffler may be provided on the release hole opening section 54.

The spool drive control port 128 is a connector unit for connecting a signal line for transmitting a drive control signal from the controller 110 to the spool actuator 120. The control sleeve sensor port 132 is a connector for connecting a signal line for transmitting an output signal of a resolver or the like which is the control sleeve sensor 130 that detects the state of the control sleeve 90 to the large-capacity-valve driving unit 150. The spool sensor port 146 is a connector for connecting a signal line for transmitting to the controller 110 an output signal of a displacement sensor which is the spool sensor 140 for detecting the state of the spool 80.

FIG. 3 is a cross sectional diagram showing details of the supply on-off valve 60 and the two-layer three-way valve 78. The supply on-off valve 60 corresponds to the supply port in the two-layer three-way valve 78, and is connected to the gas supply source 32. The supply on-off valve 60 is closed with a movement of the control sleeve 90 of the two-layer three-way valve 78 in a +X direction and is opened with the movement of the control sleeve 90 in the −X direction, or the supply on-off valve 60 is opened with the movement of the spool 80 of the two-layer three-way valve 78 in the +X direction and is closed with the movement of the spool 80 in the −X direction. FIG. 3 shows a situation when the two-layer three-way valve 78 is in a neutral state.

The supply on-off valve 60 comprises an on-off-valve body 61 forming a part of the housing of the control valve 40 and a disc mechanism 64 placed to be stored in an internal space of the on-off-valve body 61. The on-off-valve body 61 is a tubular member having one end side connected to the supply hole connecting section 52 and the other end side connected to an on-off-valve end of the fixed sleeve 91 which is a part of the housing of the two-layer three-way valve 78. On the one end side of the on-off-valve body 61, a ring-shaped protrusion 63 is provided.

The disc mechanism 64 is a bidirectional disc with a spring that has circular discs on both sides and in which a coil spring 70 having a weak spring constant is attached between the discs. More specifically, the disc mechanism 64 comprises a supply-side disc 66 which is a disc on the side of the supply hole connecting section 52, an on-off-valve disc 68 which is a disc on the side of the two-layer three-way valve 78, and the coil spring 70 which is an urging unit connecting the supply-side disc 66 and the on-off-valve disc 68. The coil spring 70 applies an urging force on the supply-side disc 66 and the on-off-valve disc 68 in a direction away from each other.

The supply-side disc 66 is a circular disk having a function of a check valve which prevents a backflow when a pressure inside the on-off-valve body 61 becomes higher than a supplied pressure, and has an outer shape with a size which can block an opening surrounded by the ring-shaped protrusion 63 provided on the one end side of the on-off-valve body 61.

The on-off-valve disc 68 is a disc having an outer shape with a size which can block, in the neutral state, the on-off-valve-side opening which is an opening which is surrounded by a ring-shaped protrusion 98 provided on the on-off-valve end side of the control sleeve 90. Because the on-off-valve disc 68 is urged by the coil spring toward the other end side of the on-off-valve body 61, in the neutral state of the control sleeve 90, the on-off-valve disc 68 is pressed on the protrusion 98 on the on-off-valve end side of the control sleeve 90. In FIG. 3, a proximal portion 65 on the on-off-valve end side is shown surrounded by a broken line.

When the spool 80 and the control sleeve 90 are in the neutral state, a ring-shaped protrusion 88 provided on the on-off-valve end side of the spool 80 is also set to have the same position in the X direction as the ring-shaped protrusion 98 of the control sleeve 90, and, thus, in the neutral state, the on-off-valve disc 68 is at the same time pressed toward the protrusion 88 of the on-off-valve end side of the spool 80. With this configuration, in the neutral state, the opening surrounding by the protrusion 98 on the on-off-valve end side of the control sleeve 90 and the opening surrounded by the protrusion 88 on the on-off-valve end side of the spool 80 are both blocked. A surface 69 of the on-off-valve disc 68 on the side of the two-layer three-way valve 78, a tip of the protrusion 98 of the control sleeve 90, and a tip of the protrusion 88 of the spool 80 are configured such that these elements can be contacted with each other in an airtight manner.

The spool 80 of the two-layer three-way valve 78 is a shaft member having a narrow shaft stem section having, when a +X direction end which is one end side in the axial direction is the on-off-valve end side, a release opening 82 on the on-off-valve end side, that extends in the axial direction, and in which there is provided a central hole 84 in which the other end is in communication with the release hole opening section 54, and a central land section 86 having a larger outer size than the stem section. The release opening 82 is an opening surrounded by the ring-shaped protrusion 88.

The control sleeve 90 is a member that is slidably supported on the fixed sleeve 91 on an outer circumferential side and that slidably supports the spool 80 on an inner circumferential side. The control sleeve 90 has, when the +X direction end which is one end side in the axial direction is the on-off-valve end side, an on-off-valve-side opening having a larger inner size than the outer size of the on-off-valve end side of the spool 80 on the on-off-valve end side, and has a guide hole that slidably supports the spool 80 in the axial direction in the inside of the control sleeve 90. The on-off-valve-side opening is an opening surrounded by the ring-shaped protrusion 98 on the on-off-valve end side. FIG. 3 shows a gap space 100 between the outer circumference of the spool on the on-off-valve end side and the inner circumference of the on-off-valve-side opening of the control sleeve 90.

The control sleeve 90 has three openings along the axial direction, one of which is a load hole 50. As described above, in the combination of the supply on-off valve 60 and the two-layer three-way valve 78, the pressurized air from the gas supply source 32 is supplied from the side of the supply on-off valve 60 in the control sleeve 90. In this respect, a structure corresponding to the supply hole is the gap space 100 of the proximal portion 65 on the on-off-valve end side. In addition, in the control sleeve 90, the air from the air spring is released to the atmosphere through the central hole 84 of the spool 80. In this respect, a structure corresponding to the release hole is also the gap space 100 of the proximal portion 65 on the on-off-valve end side. A detailed operation thereof will be described later with reference to FIGS. 6-9.

Therefore, the control sleeve 90 having the structure as shown in FIG. 3 has three openings along the axial direction on the outer circumference, and one of the openings is the load hole 50. In the neutral state, positions of the load hole 50 and the central land section 86 of the spool 80 coincide, and the load hole 50 is in a state of being closed by the central land section 86. The other openings; that is, two openings 92 and 94, are in communication with each other by a communication path 96. The two openings 92 and 94 are used to switch, with cooperation of the spool 80, the control sleeve 90, and the supply on-off valve 60, between supplying pressurized air to the load hole 50 connected to the air spring 22 and releasing the pressurized air to the atmosphere through the load hole 50. A detailed operation of these will be described later with reference to FIGS. 6-9.

Referring again to FIG. 2, the control sleeve 90 is connected to the link lever mechanism 24 via the rotation-translation conversion mechanism 44 at the −X direction end. FIG. 4 is an enlarged perspective view of this portion. FIG. 4 shows, with regard to the link lever mechanism 24, a dolly-side arm 26, a lever 28 serving as a carriage-body-side arm, and a rotation connection section 27 which rotatably connects the arms with each other.

The rotation-translation conversion mechanism 44 has a function of converting a rotational movement of the lever 28 due to a change of shape formed by the dolly-side arm 26 and the lever 28 serving as the carriage-body-side arm according to the height value into a translational movement of the control sleeve 90. With this process, the control sleeve 90 is moved and driven in the axial direction according to the height value. In this respect, the link lever mechanism 24 and the rotation-translation conversion mechanism 44 correspond to the sleeve actuator which moves and drives the control sleeve 90.

The rotation-translation conversion mechanism 44 comprises a rotational structure 162 in which a central shaft 161 is rotatably held in a casing 160 fixed on the housing of the control valve 40, a decenter pin 164 placed decentered from the central shaft 161 of the rotational structure 162, and a guide groove 168 provided on a guide plate 166 connected to the −X direction end of the control sleeve 90.

One end of the lever 28 is mounted on the central shaft 161 of the rotational structure 162. Because a guide plate 166 is integral with the control sleeve 90, the guide plate 166 is moveable only in the X direction. The guide groove 168 is a groove provided along the Z direction, and has a groove width to receive the decenter pin 164.

A resolver serving as the control sleeve sensor 130 placed inside the casing 160 detects a rotational angle of the rotational structure 162. The rotational angle of the rotational structure 162 is converted into a displacement in the axial direction of the control sleeve 90 by the rotation-translation conversion mechanism 44. Thus, the resolver serving as the control sleeve sensor 130 detects the rotational angle corresponding to the displacement of the control sleeve 90 in the axial direction. An output signal of the resolver serving as the control sleeve sensor 130 is transmitted to a control sleeve sensor port 132 through a suitable signal line. Alternatively, in place of the resolver, a rotation detection sensor of other types may be employed. For example, an encoder may be employed.

Referring again to FIG. 2, a spool shaft 118 is a portion of the spool 80 extending and protruding beyond the region of the two-layer three-way valve 78 in the −X direction. The spool actuator 120 mounted on the spool shaft 118 is a force motor of a moving coil type which moves and drives the spool 80 in the axial direction. A displacement sensor serving as the spool sensor 140 mounted on the tip of the spool shaft 118 is a differential transformer type sensor that detects the displacement of the spool 80 in the axial direction.

The spool actuator 120 comprises a drive arm 122 mounted on the spool shaft 118 and having a tip opening in a cup shape, a coil 124 provided on a tip of the drive arm 122, and a permanent magnet 126 mounted on the housing of the control valve 40 and placed to oppose the coil 124. A drive current signal is supplied from the controller 110 via the spool drive control port 128 to the coil 124. By a cooperation action of a current flowing in the coil 124 by the drive current signal and a magnetic flux of the permanent magnet 126, a drive force in the axial direction is given to the drive arm 122, and, with this process, the spool 80 can be moved and driven in the axial direction.

The spool sensor 140 is a displacement sensor that detects an amount of movement of the spool 80 in the X direction. FIG. 2 shows a differential transformer type structure as the spool sensor 140, but alternatively, a displacement sensor of a type other than the differential transformer type may be employed. For example, an optical displacement sensor, an electrostatic capacity displacement sensor, or the like may be employed.

Figure 5:
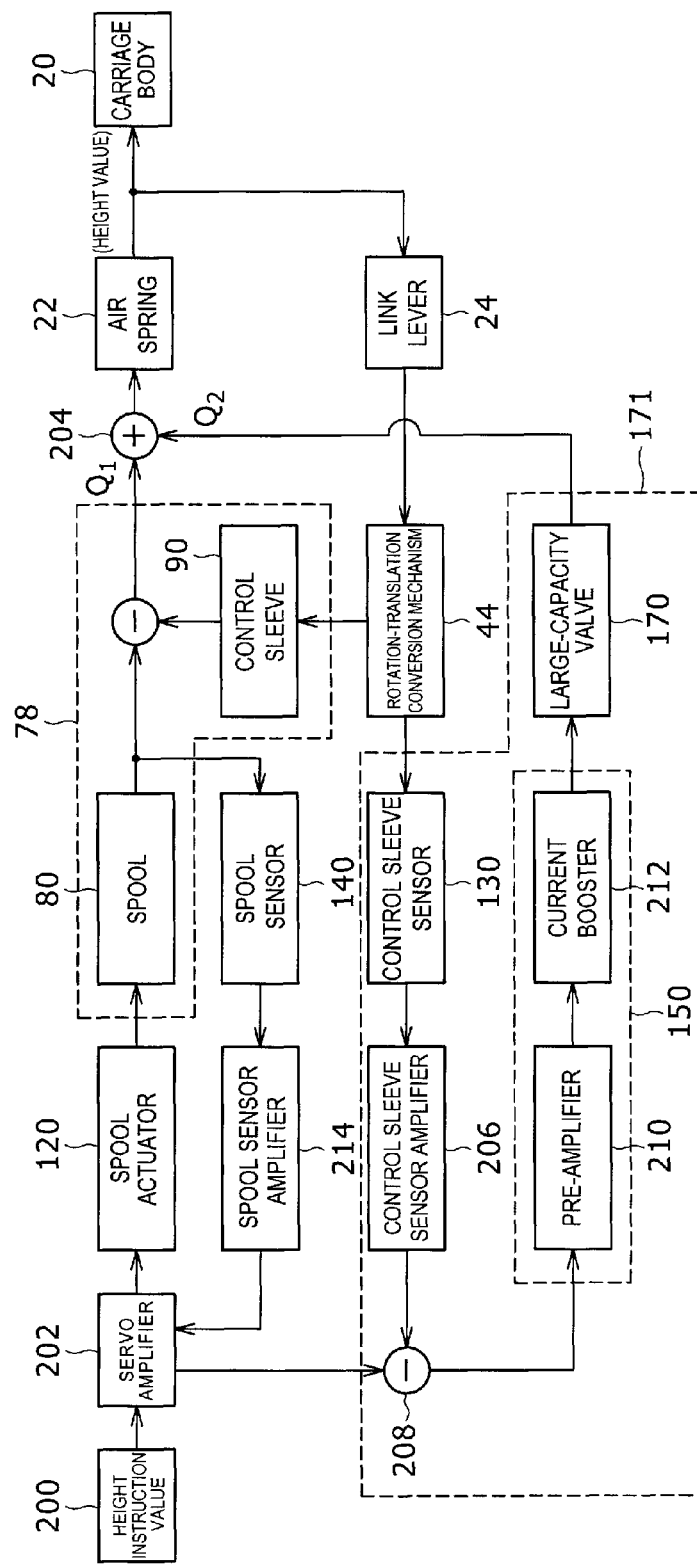
FIG. 5 is a block diagram of a carriage-body inclination device according to a preferred embodiment of the present invention.

FIG. 5 is a block diagram of the carriage-body inclination device 30 having the above-described structure. A feedback loop from the height value indicating the height between the dolly 18 and the carriage body 20 which changes by the air spring 22, through the link lever mechanism 24, the rotation-translation conversion mechanism 44, and the two-layer three-way valve 78, and returning to the air spring 22 is a loop for the level adjustment control. Here, when the actual height value h is deviated from a standard height value $h_0$ which is defined in advance and a height difference value $\Delta h$ is created, the relative positional relationship of the control sleeve 90 with respect to the spool 80 changes, pressurized air is supplied to the air spring 22 in an amount of $Q_1$ or the air is released from the air spring 22 to the atmosphere in an amount of $Q_1$, and the carriage body 20 is raised or lowered in a manner to change $\Delta h$ toward zero. The other portions correspond to a block diagram when an additional supply flow $Q_2$ is supplied to the air spring 22 in the inclination control. In particular, a portion of a broken line frame 171 corresponds to a block diagram of a portion for realizing a large-capacity output using the large-capacity valve 170.

First, a flow in the level adjustment control will be described. Here, formally, the standard height value $h_0$ which is defined in advance is given as a height instruction value 200 from the controller 110. When the height instruction value 200 is at the standard height value $h_0$, the spool 80 is at the neutral position, and, thus, the spool actuator 120 does not move and drive the spool 80.

In the link lever mechanism 24, the length of the dolly-side arm 26 is set such that the placement position of the control sleeve 90 along the axial direction is at the neutral position via the rotation-translation conversion mechanism 44 when the actual height value is at the standard height value $h_0$. Therefore, when the height value is at the standard height value $h_0$, the positional relationship between the control sleeve 90 and the spool 80 is at the neutral position. Thus, as shown in FIG. 3, the load hole 50 of the control sleeve 90 is closed by the central land section 86 of the spool 80. At the same time, the protrusion 88 at the +X direction end of the spool 80 and the protrusion 98 at the +X direction end of the control sleeve 90 are in close contact with the on-off-valve disc 68 of the supply on-off valve 60 at a proximal portion 65 on the on-off-valve end side. Therefore, no pressurized air is supplied from the control valve 40 to the air spring 22, and the air spring 22 is not opened to the atmosphere via the control valve 40.

When there is an increase or a decrease in the number of passengers and the actual height value changes from the standard height value $h_0$ by $\Delta h$, the above-described feedback loop for level adjustment control is put into effect. Specifically, with the height change $\Delta h$, the position of the control sleeve 90 in the axial direction is changed via the link lever mechanism 24 and the rotation-translation conversion mechanism 44. Because the spool 80 remains in the neutral position, the relative positional relationship between the load hole 50 of the control sleeve 90 and the central land section 86 of the spool 80 changes. A configuration is employed in which, when $\Delta h$ is positive, the control sleeve 90 moves with respect to the spool 80 such that the air is opened to the atmosphere from the air spring 22 via the control valve 40. That is, because the on-off-valve disc 68 is pushed at the same time as the movement of the control sleeve 90 in the +X direction, a gap through which pressurized air can pass is created at the land section 86 and the protrusion 88 of the spool 80, and the pressurized air in the air spring is released through the passage to the atmosphere. With this process, the height difference value $\Delta h$ is reduced, and, accordingly, the movement of the control sleeve 90 is returned toward the neutral position. In this manner, the feedback is applied via the link lever mechanism 24 to set the height difference value $\Delta h$ to zero.

Next, a flow for the inclination control will be described. When the carriage 10 is required to incline the carriage body 20 in order to compensate for insufficient cant, different set height values are given to the air springs. For example, in the structure of FIG. 1, the air spring 22 is given a set height value $h_1$ and the air spring 23 is given a set height value $h_2$. The inclination control is applied such that the actual height values are set at the set height values $h_1$ and $h_2$. In the following description, a case will be described in which the air spring 22 is given the set height value $h_1$. If the positional relationship between the carriage body 20 and the dolly 18 before the inclination control is started is at a parallel state, the actual height value is at the standard height value $h_0$ and the control sleeve 90 is at the neutral position.

When the set height value $h_1$ is given from the controller 110 as the height instruction value 200, a drive signal for the spool actuator 120 is generated at a servo amplifier 202. If the set height value $h_1$ is larger than the standard height value $h_0$, the position of the spool 80 in the axial direction is changed to extend the air spring 22. Because the control sleeve 90 remains in the neutral state, the relative positional relationship between the load hole 50 of the control sleeve 90 and the central land section 86 of the spool 80 changes. A configuration is employed in which the spool 80 moves with respect to the control sleeve 90 such that pressurized air is supplied via the control valve 40 to the air spring 22. That is, because the on-off-valve disc 68 is pushed at the same time as the spool 80 moves in the +X direction, a gap through which pressurized air can pass is created at the load hole 50 and the protrusion 98 of the control sleeve 90, and the pressurized air is supplied through the passage into the air spring 22.

With this process, the height value is increased. When the height value is increased, the control sleeve 90 is moved in the axial direction via the link lever mechanism 24 and the rotation-translation conversion mechanism 44, and a feedback similar to that in the level adjustment control acts. The feedback acts continuously until the central land section 86 of the spool 80 and the load hole 50 of the control sleeve 90 coincide. The position of the central land section 86 of the spool 80 in the axial direction is offset from the position when the height value is at the standard height value $h_0$, and is at a position corresponding to the height value of the set height value $h_1$. Therefore, the control sleeve 90 moves in the axial direction until the actual height value h is at the set height value $h_1$. When the actual height value h reaches the set height value $h_1$, the positions of the load hole 50 of the control sleeve 90 and the central land section 86 of the spool 80 coincide, supply of pressurized air from the control valve 40 to the air spring 22 is stopped, and the movement of the control sleeve 90 is also stopped.

As described above, in the inclination control, the position of the spool 80 in the axial direction is offset from the neutral position corresponding to the standard height value $h_0$ to a position corresponding to the set height value $h_1$. In correspondence to this offset, the control sleeve 90 is moved and driven in the axial direction and the actual height value is set at the set height value $h_1$. In other words, other than the position of the spool 80 in the axial direction being offset, the feedback including the link lever mechanism 24 similar to that in the adjustment control is used.

In this control, the amount of flow of the pressurized air supplied to the air spring 22 is limited by the supply flow $Q_1$ of the control valve 40. Thus, in order to increase the supply flow, the large-capacity valve 170 is used. A loop which uses the large-capacity valve 170 will now be described. An electrical signal which is output from the control sleeve sensor 130 included in the rotation-translation conversion mechanism 44 receives suitable amplification and signal conversion from a control sleeve sensor amplifier 206. An output of the control sleeve sensor amplifier 206 is subtracted at a subtractor 208 from an output of the servo amplifier 202 produced by the height instruction value 200. With this subtraction process, a height difference value which is a difference between the set height value $h_1$ which is the height instruction value 200 and the actual height value is determined. The height difference value is a value based on the electrical signal value.

The height difference value is suitably amplified by a preamplifier 210 of the large-capacity-valve driving unit 150, and a necessary signal conversion is applied thereto, to obtain a drive signal of the large-capacity valve 170 by a current booster 212. The large-capacity valve 170 is driven with the drive signal. A supply flow $Q_2$ of the large-capacity valve 170 is significantly larger compared to the supply flow $Q_1$ of the control valve 40.

An adder 204 merges the supply flow $Q_1$ of the control valve 40 and the supply flow $Q_2$ of the large-capacity valve 170, and specifically corresponds to a merging portion of the control valve path 42 and the large-capacity valve path 172 of FIG. 1. With this process, the pressurized air is supplied to the air spring 22 with a significantly larger amount of flow compared to the case where only the control valve 40 is used. For example, $Q_2$ may be set to be 5 times $Q_1$, and, with the use of the large-capacity valve 170, a supply flow $(Q_1+Q_2)$ which is six times the supply flow $Q_1$ when only the control valve 40 is used can be supplied to the air spring 22. In this manner, the rate of extension of the air spring 22 is significantly quickened.

When the air spring 22 extends with a total supply flow in which the supply flow from the large-capacity valve 170 is added and the height value changes, the feedback control is applied to each of the control valve 40 and the large-capacity valve 170. For the control valve 40, as described above, the control is applied by a feedback loop of the link lever mechanism 24, the rotation-translation conversion mechanism 44, the two-layer three-way valve 78, and the air spring 22. For the large-capacity valve 170, the control is applied by a feedback loop of the link lever mechanism 24, the rotation-translation conversion mechanism 44, the control sleeve sensor 130, the control sleeve sensor amplifier 206, the subtractor 208, the large-capacity-valve driving unit 150, the large-capacity valve 170, the adder 204, and the air spring 22.

In the above, a case has been described in which the pressurized air is supplied to the air spring 22, but the process is similar when the air is released from the air spring 22.

In FIG. 5, the loop of the spool sensor 140 and a spool sensor amplifier 214 applies a position feedback for the movement and driving of the spool 80. That is, the loop is a loop from the servo amplifier 202 to which the height instruction value 200 is given, via the spool actuator 120, the spool 80, the displacement detection by the spool sensor 140, and suitable amplification and necessary signal conversion by the spool sensor amplifier 214, and returning to the servo amplifier 202, and the position of the spool 80 is fed back to the drive signal of the spool actuator 120. With this configuration, a position control of the spool 80 is stabilized and precision is improved.

Figure 6:
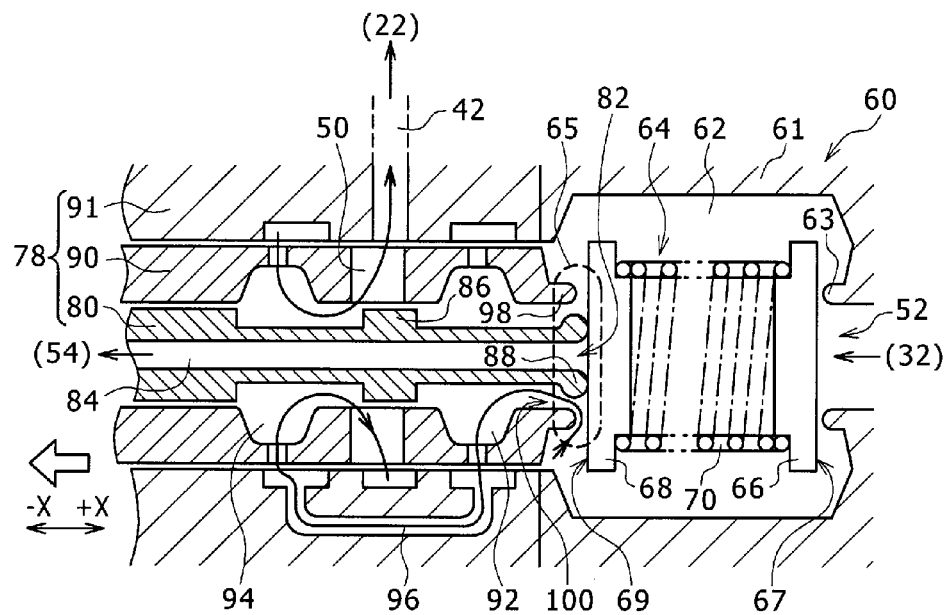
FIG. 6 is a diagram for explaining extension of an air spring during level adjustment in a preferred embodiment of the present invention.
Figure 7:
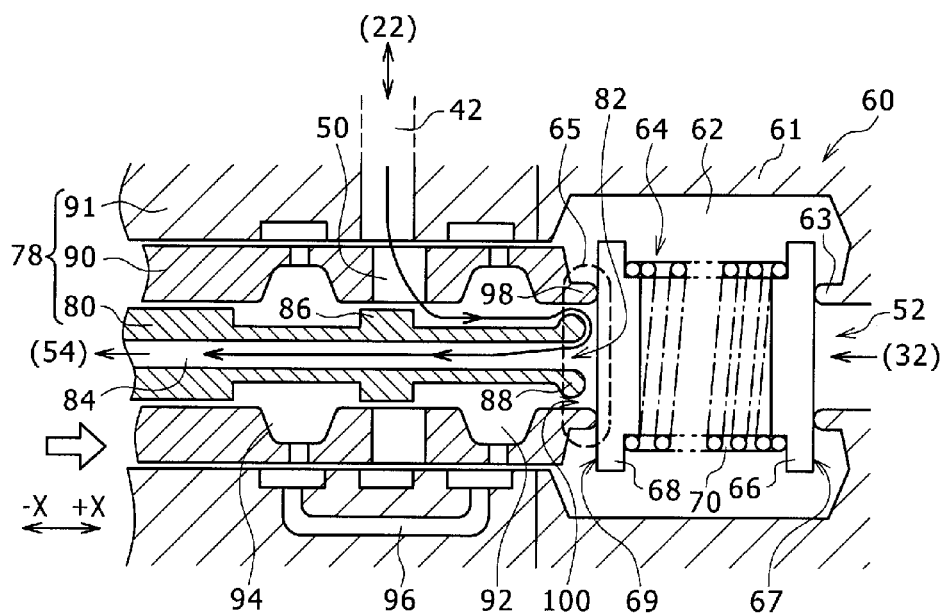
FIG. 7 is a diagram for explaining contraction of an air spring during level adjustment in a preferred embodiment of the present invention.
Figure 8:
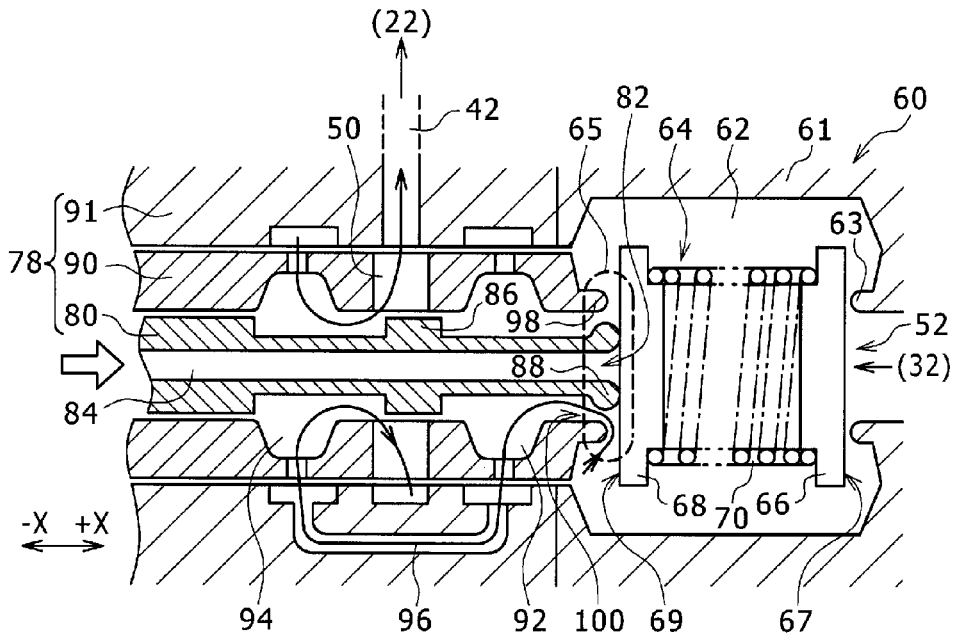
FIG. 8 is a diagram for explaining extension of an air spring during carriage-body inclination in a preferred embodiment of the present invention.
Figure 9:
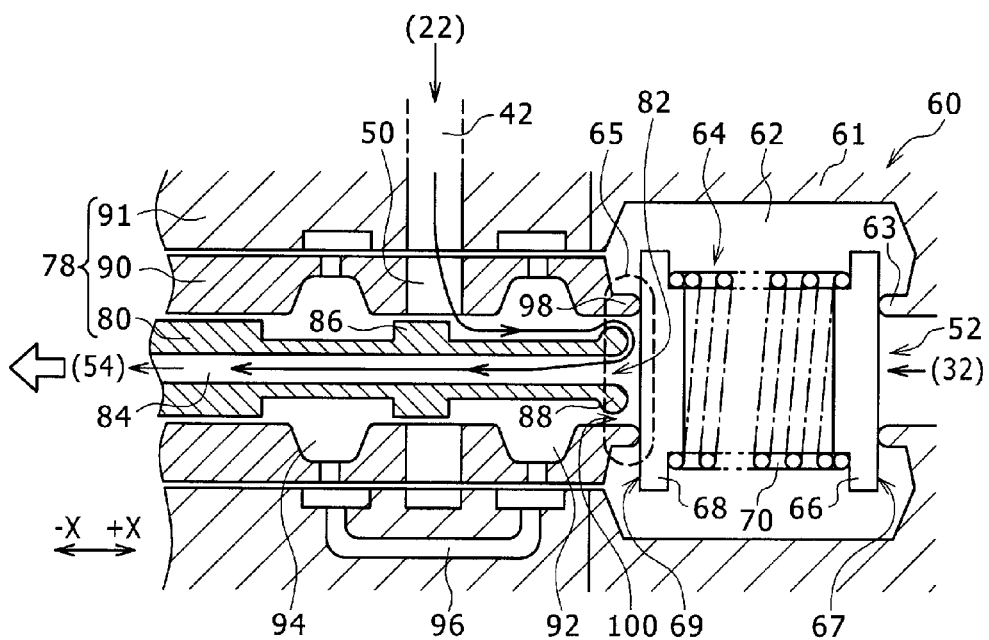
FIG. 9 is a diagram for explaining contraction of an air spring during carriage-body inclination in a preferred embodiment of the present invention.

The operation of the above-described structure, in particular, the operation of the supply on-off valve 60 and the two-layer three-way valve 78, will now be described in detail with reference to FIGS. 6-9. FIGS. 6 and 7 are diagrams for explaining level adjustment control. FIG. 6 is a diagram for a case where the pressurized air is supplied to the air spring 22 because the actual height value h is lower than the standard height value $h_0$, and FIG. 7 is a diagram for a case where the pressurized air is released from the air spring 22 because the actual height value h is higher than the standard height value $h_0$. FIGS. 8 and 9 are diagrams for explaining inclination control. FIG. 8 is a diagram for a case where the pressurized air is supplied to the air spring 22 because the actual height value h is lower than the set height value $h_1$, and FIG. 9 is a diagram for a case where the pressurized air is released from the air spring 22 because the actual height value h is higher than the set height value $h_1$.

FIG. 6 shows a case in the level adjustment control where the actual height value h is lower than the standard height value $h_0$. This case corresponds to a case where the control sleeve 90 is moved in the −X direction with respect to the spool 80 at the neutral position by the link lever mechanism 24 and the rotation-translation conversion mechanism 44. In this case, because the control sleeve 90 moves backward with respect to the spool 80, a gap is created between the protrusion 98 of the control sleeve 90 and the on-off-valve disc 68 at the proximal portion 65 on the on-off-valve end side, and the pressurized air from the supply hole connecting section 52 flows through the gap and into the gap space 100 between the inner circumference of the control sleeve 90 and the outer circumference of the spool 80. The pressurized air further flows into the load hole 50 through the opening 92, the communication path 96, and the opening 94, and through the opening at the −X direction side created by a deviation of the positional relationship between the central land section 86 of the spool 80 and the load hole 50, and is supplied from the control valve path 42 to the air spring 22.

In this manner, by the supply hole connecting section 52 and the air spring 22 becoming in communication with each other, the pressurized air is supplied to the air spring 22 and the air spring 22 is extended. When the air spring 22 is extended, the height value h is increased. When the height value h is increased, the control sleeve 90 is returned in the +X direction with respect to the spool 80. When the height value h reaches the standard height value $h_0$, the positions of the central land section 86 of the spool 80 and the load hole 50 of the control sleeve 90 coincide, and the protrusion 98 on the tip of the control sleeve 90 becomes closely in contact with the on-off-valve disc 68 of the supply on-off valve 60. With this process, the structure returns to the neutral state as described with reference to FIG. 3, and the supply of pressurized air from the supply hole connecting section 52 is stopped. In this manner, the level adjustment control to return the actual height value to the standard height value $h_0$ is automatically executed.

FIG. 7 shows a case in the level adjustment control where the actual height value h is higher than the standard height value $h_0$. This case corresponds to a case where the control sleeve 90 is moved in the +X direction with respect to the spool 80 at the neutral position by the link lever mechanism 24 and the rotation-translation conversion mechanism 44. In this case, because the control sleeve 90 is protruded with respect to the spool 80, the on-off-valve disc 68 blocks the on-off-valve-side opening of the control sleeve 90 by the urging force of the coil spring 70 serving as the urging unit of the supply on-off valve 60. Specifically, the on-off-valve disc 68 is pressed to the ring-shaped protrusion 98 of the control sleeve 90 in the proximal portion 65 on the on-off-valve end side. With this process, the supply of pressurized air from the supply hole connecting section 52 is blocked. In addition, with this process, a gap is created between the on-off-valve end side of the spool 80 and the on-off-valve disc 68, and thus, the release opening 82 of the spool 80 and the internal space between the inner circumference of the control sleeve 90 and the outer circumference of the spool 80 become in communication with each other. More specifically, a gap is created between the ring-shaped protrusion 88 on the on-off-valve end side of the spool 80 and the on-off-valve disc 68. With this process, the gap space 100 between the inner circumference of the control sleeve 90 and the outer circumference of the spool 80 and the release opening 82 of the spool 80 become in communication with each other.

The space becomes in communication with the load hole 50 from the opening on the +X direction side crated by the deviation of the positional relationship between the central land section 86 of the spool 80 and the load hole 50, and becomes in communication with the air spring 22 from the control valve path 42. Therefore, the air from the air spring 22 passes through the control valve path 42, the load hole 50, the gap space 100, and the release opening 82, and is released via the release hole opening section 54 to the atmosphere.

Because the air spring 22 and the release hole opening section 54 become in communication with each other in this manner, the air from the air spring 22 is released to the atmosphere, and the air spring 22 is contracted. When the air spring 22 is contracted, the height value h is reduced. When the height value h is reduced, the control sleeve 90 is returned in the −X direction with respect to the spool 80. When the height value h reaches the standard height value $h_0$, the positions of the central land section 86 of the spool 80 and the load hole 50 coincide, and the protrusion 88 at the tip of the spool 80 becomes in close contact with the on-off-valve disc 68 of the supply on-off valve 60. With this process, the structure returns to the neutral state of FIG. 3, and the release of air from the air spring 22 is stopped. In this manner, the level adjustment control to return the actual height value to the standard height value $h_0$ is automatically executed.

Next, the inclination control will be described. In the inclination control, as described above, the inclination control can be more quickly executed using the large-capacity valve 170. The use of the large-capacity valve 170 is for quickening the inclination control, but in the operation of the supply on-off valve 60 and the two-layer three-way valve 78, the only difference between the large-capacity valve 170 and the control valve 40 is in the magnitude of the amount of flow, and, thus, in the following description, a configuration is described in which the large-capacity valve 170 is not used and only the control valve 40 is used. In the following description, a configuration is considered in which, before the inclination control is started, the height value indicating the height between the dolly 18 and the carriage body 20 is at the standard state and the control sleeve 90 is at the neutral state.

FIG. 8 shows a case where the height value is set at a high value in the inclination control. This case corresponds to a case where the spool 80 is moved in the +X direction with respect to the control sleeve 90 at the neutral position by the spool actuator 120. In this case, because the spool 80 protrudes with respect to the control sleeve 90, a gap is created between the protrusion 98 of the control sleeve 90 and the on-off-valve disc 68 at the proximal section 65 at the on-off-valve end side, and the pressurized air from the supply hole connecting section 52 flows through the gap into the gap space 100 between the inner circumference of the control sleeve 90 and the outer circumference of the spool 80. The pressurized air then passes through the opening 92, the communication path 96, and the opening 94, and from the opening on the −X direction side created by a deviation of the positional relationship between the central land section 86 of the spool 80 and the load hole 50 to the load hole 50, and is supplied from the control valve path 42 to the air spring 22.

When the supply hole connecting section 52 and the air spring 22 become in communication with each other in this manner, the pressurized air is supplied to the air spring 22, and the air spring 22 is extended. When the air spring 22 is extended, the height value h is increased. When the height value h is increased, the control sleeve 90 is moved in the +X direction with respect to the spool 80. When the height value h reaches the set height value $h_1$, the positions of the central land section 86 of the spool 80 and the load hole 50 of the control sleeve 90 coincide, and the protrusion 98 of the tip of the control sleeve 90 becomes in close contact with the on-off-valve disc 68 of the supply on-off valve 60. With such a configuration, corresponding to the setting of the height value, the supply of the pressurized air from the supply hole connecting section 52 is stopped at a state in which the control sleeve 90 and the spool 80 are offset in the +X direction as compared with the neutral state described with reference to FIG. 3. In this manner, the inclination control to set the actual height value to the set height value $h_1$ is automatically executed.

FIG. 9 shows a case in the inclination control where the height value is set at a low value. This case corresponds to a case where the spool 80 is moved backward in the −X direction with respect to the control sleeve 90 at the neutral position by the spool actuator 120. In this case, the spool 80 is withdrawn with respect to the control sleeve 90. In this configuration, the on-off-valve disc 68 blocks the on-off-valve-side opening of the control sleeve 90. More specifically, the on-off-valve disc 68 is pressed on the ring-shaped protrusion 98 of the control sleeve 90 at the proximal portion 65 on the on-off-valve end side. With this process, the supply of pressurized air from the supply hole connecting section 52 is blocked. Because a gap is created between the on-off-valve end side of the spool 80 and the on-off-valve disc 68, the release opening 82 of the spool 80 and the internal space between the inner circumference of the control sleeve 90 and the outer circumference of the spool 80 become in communication with each other. Specifically, a gap is created between the ring-shaped protrusion 88 on the on-off-valve end side of the spool 80 and the on-off-valve disc 68. With this process, the gap space 100 between the inner circumference of the control sleeve 90 and the outer circumference of the spool 80 and the release opening 82 of the spool 80 become in communication with each other.

The space becomes in communication with the load hole 50 from an opening on the +X direction side created by the deviation of the positional relationship between the central land section 86 of the spool 80 and the load hole 50, and becomes in communication from the control valve path 42 to the air spring 22. Therefore, the air from the air spring 22 passes through the control valve path 42, the load hole 50, the gap space 100, and the release opening 82, and is released via the release opening 54 to the atmosphere.

Because the air spring 22 and the release opening section 54 become in communication with each other in this manner, the air from the air spring 22 is released to the atmosphere, and the air spring 22 is contracted. When the air spring 22 is contracted, the height value h is reduced. When the height value h is reduced, the control sleeve 90 is returned in the −X direction with respect to the spool 80. When the height value h reaches the set height value $h_1$, the positions of the central land section 86 of the spool 80 and the load hole 50 coincide, and the protrusion 98 of the tip of the control sleeve 90 becomes in close contact with the on-off-valve disc 68 of the supply on-off valve 60. With this process, corresponding to the setting of the height value, the release of the air from the air spring 22 is stopped at a state in which the control sleeve 90 and the spool 80 are offset in the −X direction compared to the neutral state described with reference to FIG. 3. In this manner, the inclination control to set the actual height value to the set height value $h_1$ is automatically executed.

In the above, a structure in which the supply on-off valve 60 and the two-layer three-way valve 78 are combined is described as the control valve 40. The control sleeve 90 of the two-layer three-way valve 78 has a structure having three openings on the outer circumference along the axial direction, one being the load hole and the other two openings not being a supply hole or a release hole. Alternatively, a typical spool-sleeve type three-way valve structure may be employed in which three land sections are provided on the spool, and the supply hole, the load hole, and the release hole are placed on the outer circumference of the control sleeve along the axial direction.

Figure 10:
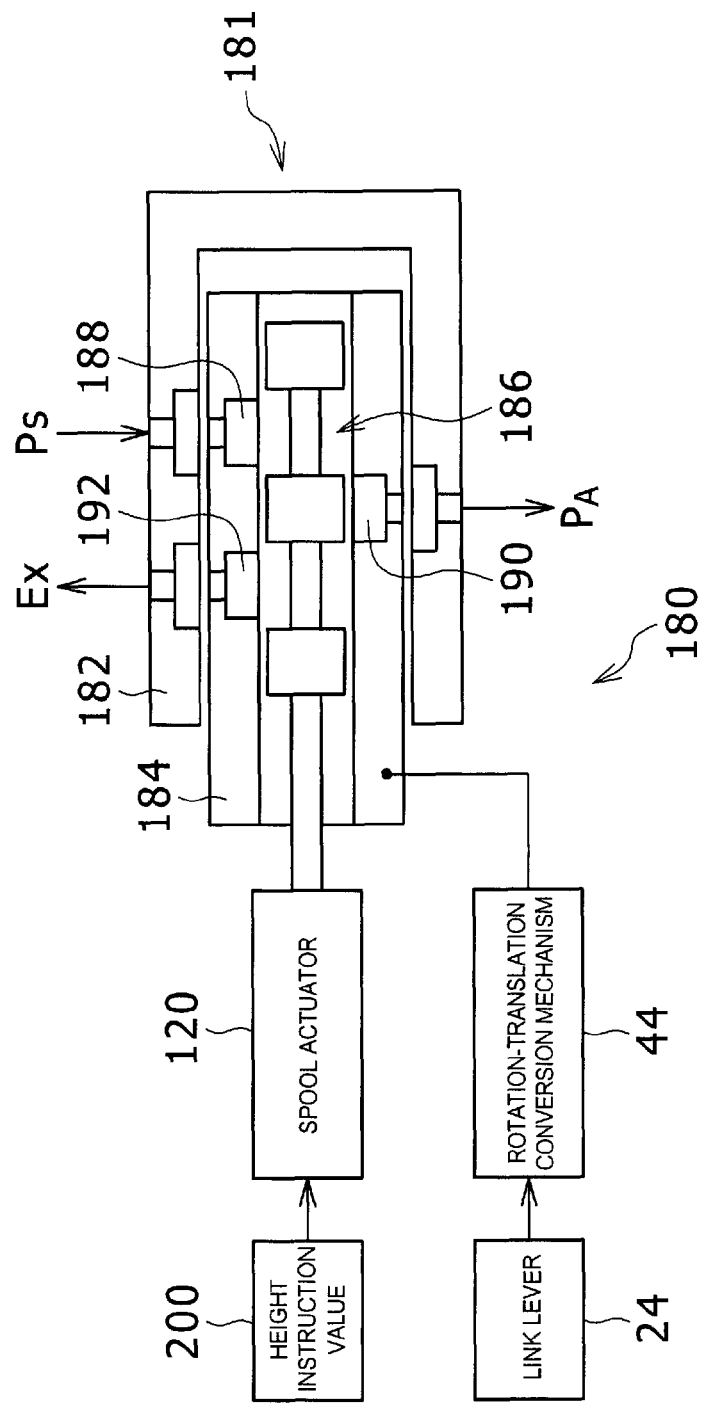
FIG. 10 is a diagram for explaining a control valve of another structure in a preferred embodiment of the present invention.

FIG. 10 is a diagram for explaining a basic structure of an example configuration of a control valve 180 having such a structure. A three-way valve 181 used herein comprises a fixed sleeve 182, a control sleeve 184, and a spool 186. The spool 186 can be driven in the axial direction by the spool actuator 120, and the control sleeve 184 can be driven in the axial direction by the link lever mechanism 24 and the rotation-translation conversion mechanism 44. In the spool 186, three land sections are provided on a stem, distanced from each other in the axial direction. In the control sleeve 184, a supply hole 188, a load hole 190, and a release hole 192 are placed in order, on the outer circumference along the axial direction, corresponding to the placement of the three land sections.

In the neutral state, the position of the load hole 190 coincides with the position of the central land section of the spool 186, and the central land blocks the load hole 190. The supply hole 188 and the release hole 192 are placed corresponding to the positions of the front and rear stems of the central land section. In addition, in the fixed sleeve 182, a supply port, a load port, and a release port are provided corresponding to the supply hole 188, the load hole 190, and the release hole 192 of the control sleeve 184. The control sleeve 184 can be moved in the axial direction with respect to the fixed sleeve 182 within a predefined movement range, and, in the movement range, the supply hole 188 is within the range of the supply port, the load hole 190 is within the range of the load port, and the release hole 192 is within the range of the release port.

With the control valve 180 which uses the three-way valve 181 and having the structure of FIG. 10 also, the structure of the block diagram explained with reference to FIG. 5 can be employed, and the operations of FIGS. 6-9 can be effected.

In the above, the movement and driving of the control sleeve are described as being effected by the link lever mechanism in which the shape changes according to the height value, and the movement and driving of the spool are described as being effected by the spool actuator. The set height value may be changed by setting the offset of the relative position of the spool and the control sleeve. Therefore, the movement and driving of the spool may alternatively be effected by the link lever mechanism in which the shape changes according to the height value and the movement and driving of the control sleeve may alternatively be effected by the control sleeve actuator such as a force motor.

INDUSTRIAL APPLICABILITY

The carriage-body inclination device and two-layer three-way valve for carriage-body inclination body according to the present invention are used in a carriage in which the carriage body is inclined with respect to a dolly by extending or contracting an air spring provided between the dolly and the carriage body.

EXPLANATION OF REFERENCE NUMERALS

10 CARRIAGE; 12 ROAD SURFACE; 14, 15 RAIL; 16, 17 WHEEL; 18 DOLLY; 20 CARRIAGE BODY; 22, 23 AIR SPRING; 24, 25 LINK LEVER MECHANISM; 26 DOLLY-SIDE ARM; 287 ROTATION CONNECTION SECTION; 28 LEVER; 30 CARRIAGE-BODY INCLINATION DEVICE; 32 GAS SUPPLY SOURCE; 40, 180 CONTROL VALVE; 41 LOAD HOLE CONNECTING SECTION; 42 CONTROL VALVE PATH; 44 ROTATION-TRANSLATION CONVERSION MECHANISM; 50, 190 LOAD HOLE; 52 SUPPLY HOLE CONNECTING SECTION; 54 RELEASE HOLE RELEASING SECTION; 60 SUPPLY ON-OFF VALVE; 61 ON-OFF-VALVE BODY; 62 INTERNAL SPACE; 63, 88, 98 PROTRUSION; 64 DISC MECHANISM; 65 PROXIMAL PORTION ON ON-OFF-VALVE END SIDE; 66 SUPPLY-SIDE DISC; 67, 69 SURFACE; 68 ON-OFF-VALVE DISC; 70 COIL SPRING; 78 TWO-LAYER THREE-WAY VALVE; 80, 186 SPOOL; 82 RELEASE OPENING; 84 CENTRAL HOLE; 86 CENTRAL LAND SECTION; 90, 184 CONTROL SLEEVE; 91, 182 FIXED SLEEVE; 92, 94 OPENING; 96 COMMUNICATION PATH; 100 GAP SPACE; 110 CONTROLLER; 112, 113 INDIVIDUAL INCLINATION UNIT; 118 SPOOL SHAFT; 120 SPOOL ACTUATOR; 122 DRIVE ARM; 124 COIL; 126 PERMANENT MAGNET; 128 SPOOL DRIVE CONTROL PORT; 130 CONTROL SLEEVE SENSOR; 132 CONTROL SLEEVE SENSOR PORT; 140 SPOOL SENSOR; 142 MAGNETIC STRUCTURE SHAFT; 144 COIL; 146 SPOOL SENSOR PORT; 150 LARGE-CAPACITY-VALVE DRIVING UNIT; 160 CASING; 161 CENTRAL SHAFT; 162 ROTATIONAL STRUCTURE; 164 DECENTER PIN; 166 GUIDE PLATE; 168 GUIDE GROOVE; 170 LARGE-CAPACITY VALVE; 171 BROKEN LINE FRAME (BLOCK DIAGRAM FOR LARGE-CAPACITY OUTPUT); 172 LARGE-CAPACITY VALVE PATH; 174, 176 ON-OFF VALVE; 181 THREE-WAY VALVE; 188 SUPPLY HOLE; 192 RELEASE HOLE; 200 HEIGHT INSTRUCTION VALUE; 202 SERVO AMPLIFIER; 204 ADDER; 206 CONTROL SLEEVE SENSOR AMPLIFIER; 208 SUBTRACTOR; 210 PRE-AMPLIFIER; 212 CURRENT BOOSTER; 214 SPOOL SENSOR AMPLIFIER.

The invention claimed is:

1. A carriage-body inclination device that supplies gas to or releases the gas from an air spring placed between a carriage body of a carriage and a dolly, to extend or contract the air spring and to change a height value which is a height between the carriage body and the dolly, the carriage-body inclination device comprising:
   a two-layer three-way valve including
   a spool that has a small-size stem and a large-size land,
   a fixed sleeve that has a supply port connected to a gas supply source, a release port, and a load port connected to the air spring, and
   a control sleeve that is slidably supported on the fixed sleeve on an outer circumferential side, that slidably supports the spool on an inner circumferential side, that has a load hole corresponding at least to the land of the spool, that can be moved relative to the fixed sleeve within a predetermined movement range which is defined in advance, and in which the load hole is in a range of the load port of the fixed sleeve in the predetermined movement range, and
   wherein an amount of flow of gas supplied from the supply port via the load port to the air spring is determined or an amount of flow of gas released from the air spring via the load port, and through the release port is determined based on a relative positional relationship between the land of the spool and the load hole of the control sleeve;
   a spool actuator that moves and drives the spool in an axial direction with respect to the fixed sleeve of the two-layer three-way valve according to a set height value which is a setting value for the height value; and a sleeve actuator that moves and drives the control sleeve in an axial direction with respect to the spool of the two-layer three-way valve according to a height difference value which is a difference between the set height value and an actual height value.

2. The carriage-body inclination device according to claim 1, wherein the sleeve actuator comprises:

a link lever mechanism that has a dolly-side arm having one end rotatably supported on a dolly side and the other end rotatably supported by a rotation connection section, and a carriage-body-side arm that has one end rotatably supported by the rotation connection section and the other end rotatably supported on a carriage-body side, and in which a shape formed by the dolly-side arm and the carriage-body-side arm changes according to the height value;

a rotational unit that is provided on a carriage-body-side support unit of the link lever mechanism and that rotates according to the shape change of the link lever mechanism; and a rotation-translation conversion mechanism that converts a rotation of the rotational unit into a translational movement of the control sleeve in the axial direction.

3. The carriage-body inclination device according to claim 1, further comprising:

a control sleeve sensor that detects a state of the control sleeve of the two-layer three-way valve and that outputs the detected state as an electrical signal; and a large-capacity valve that is driven by an electrical signal and according to an output of the control sleeve sensor, that has a larger flow capacity than the two-layer three-way valve, and in which an output hole is connected to the air spring together with the load port of the two-layer three-way valve.

4. The carriage-body inclination device according to claim 1, further comprising:

a spool sensor that detects a state of the spool of the two-layer three-way valve and that outputs the detected state as an electrical signal; and a feedback loop that feeds back an output of the spool sensor to a drive signal of the spool actuator.

5. The carriage-body inclination device according to claim 1, wherein the spool of the two-layer three-way valve has a stem section that has a release opening on an on-off-valve end side which is one end side in the axial direction, that extends in the axial direction, and in which a central hole through which the other end is in communication with the release port is provided, and a central land section having a larger outer size than the stem section, the control sleeve has a load hole that has, on an on-off-valve end side which is one end side in the axial direction, an on-off-valve-side opening having a larger inner size than an outer size of the spool at the on-off-valve end side, that slidably supports the spool in the axial direction, and that is placed at a position blocked by the central land section of the spool when the relative position with the spool is at a neutral state, and two openings that are placed in front and rear of the load hole along the axial direction and that are in communication with each other beyond the load hole, and with respect to the two-layer three-way valve, there is provided a supply on-off valve having a tubular on-off-valve body having one end side connected to the gas supply source and the other end side connected to the on-off valve end of the control sleeve, an on-off-valve disc that is stored in the on-off valve body and that has a size to block the on-off-valve-side opening of the control sleeve, and an urging unit that urges the on-off-valve disc toward the on-off-valve end side of the control sleeve.

6. A two-layer three-way valve for a carriage-body inclination device, comprising:

a spool that has a small-size stem and a large-size land;

a fixed sleeve that has a supply port connected to a gas supply source, a release port, and a load port connected to an air spring; and a control sleeve that is slidably supported on the fixed sleeve at an outer circumferential side, that slidably supports the spool on an inner circumferential side, that has a load hole corresponding at least to the land of the spool, that can be moved relative to the fixed sleeve within a predetermined movement range which is defined in advance, and in which the load hole is in a range of the load port of the fixed sleeve in the predetermined movement range; wherein an amount of flow of gas supplied from the supply port via the load port to the air spring is determined or an amount of flow of gas released from the air spring via the load port, and through the release port is determined based on a relative positional relationship between the land of the spool and the load hole of the control sleeve.

\* \* \* \* \*